Patented Jan. 30, 1934

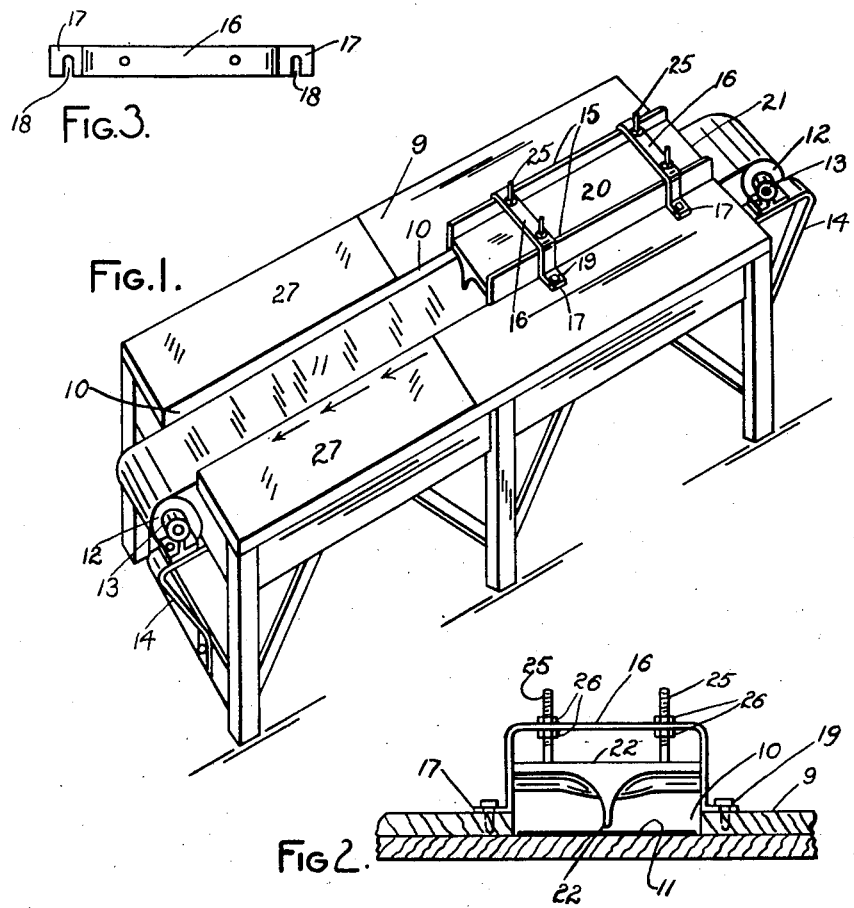

1,945,073

UNITED STATES PATENT OFFICE 1,945,073

FINAL MOLDING APPARATUS FOR BREAD ROLLS AND THE LIKE

Jacob Lauder Raith, Petersham, near Sydney, New South Wales, Australia, assignor of fifty-one per cent to Automatic Bread Baking Company, Limited, Sydney, New South Wales, Australia Application April 24, 1930, Serial No. 446,919, and in Australia September 12, 1929

6 Claims. (Cl. 107—9)

Heretofore in the making of French rolls and the like the dough pieces were usually received from a final molder and then split and molded or shaped by hand, thus requiring the expenditure of a good deal of time and labour, especially where the output was large. Now this invention has been specially devised to provide comparatively cheap and simple apparatus whereby the dough pieces are quickly conveyed from the molder or other source of supply and automatically split and finally molded or shaped, without the necessity of any manual operations, or damaging of the rolls by laceration in the splitting.

The improved final molding apparatus specially for French rolls and the like consists of the combination with a table having one or more travelling belts thereon adapted to receive the dough pieces from a final molder or other source of supply of a dividing or splitting and final molding or shaping frame fitting over each of the travelling belts, and having a board therein or thereon with its underside shaped to the contour of a pair of rolls, and also having a ridging medially positioned to form a splitting or dividing member. Means may be provided for raising and lowering the frame from the belts and for adjusting the angular set thereof.

In order to further describe the invention reference will be had to the annexed drawing wherein:—

Fig. 1 is a perspective view of a more or less schematic arrangement of the invention.

Fig. 2 is an enlarged transverse section of the table from the discharge end.

Fig. 3 is a plan of a supporting bracket for the splitting and molding frame.

Fig. 4 is a side view of the splitting and molding board while Fig. 5 is a "discharge" end elevation of the said board, and Fig. 6 is a cross section on lines 6—6 in Fig. 4 and Fig. 7 a cross section on line 7—7 also in Fig. 4.

Fig. 8 is a "receiving" end elevation of the said board.

The table 9 of suitable material say timber is supported upon legs at a convenient height and has cross stays where required, and there is a channel 10 formed therein extending longitudinally from end to end. This channel 10 is of a width approximating to that of the dough pieces and one side of an endless belt conveyor 11 of canvas passes therealong, and over end rollers 12 on shafts in bearings 13 supporting on brackets 14 affixed to the table ends. The belt conveyor 11 is revolved by a pulley or the like on one of the roller shafts from a suitable power source.

The splitting and molding frame consists of two side plates 15 connected by two supporting brackets 16 which have feet 17 with slots 18 therein, and hold the said side plates 15 in proper spaced relationship so that the frame will sit over the belt conveyor 11 with the edges of said plates 15 aligned with the channel 11. The frame is held in place on the table 9 at the receiving end by sliding the feet 17 under the heads of bolts 19 fixed in said table 9 and the stems of which fit in the slots 18.

The splitting and molding board 20 is of oblong shape and adapted to neatly fit between the side plates 15 and is of say cast aluminum or other suitable material. This board 20 on the underside is somewhat thickened at its leading in or receiving end 21 and (see Fig. 8) and flat horizontally and then gradually slopes downwardly, and a medial ridge 22 gradually develops from a blunt nose portion 23 (see Fig. 7) and leads to the discharging end where it is narrow. On either side of the ridge 22 there are concavities 24 which gradually develop from inwardly of the receiving end 21 and from shallow to deeper concavities as seen in Figs. 5 to 8 of the drawing.

The board 20 is suspended above the belt 11 by means of four studs 25 which are fast in its back and pass up through orifices in the brackets 16 and have nuts 26 on each side thereof for adjusting the height and the angular set of the said board 20.

If desired the end of the table 9 where the split and shaped rolls are put in the baking tins is faced with metal plates 27 to prevent injury of said table 9.

In use the molding board 20 and its parts are placed in position as seen in Fig. 1 and the height of the underside of said board 20 is adjusted to the proper height above the belt conveyor 11 and the nuts 26 tightened.

Now the apparatus is ready for use and upon the belt conveyor 11 being set in motion the dough pieces as they are received are conveyed to under the board 20 where they are gradually shaped by the contour thereof as they proceed to the other end and are also gradually divided into a pair of French rolls which are complete in shape on reaching the discharge end and are free from mutilation in the division and shaping. Upon proceeding past the board 20 the finished rolls are put in the baking tins as ordinarily.

If necessary to cope with a large output two or more of the boards 20 and their parts may be arranged upon a table provided with the necessary number of channels and belts.

I claim:

1. A molding board for apparatus of the class described comprising, a board-like member having a longitudinally disposed ridge depending centrally therefrom, said ridge gradually developing from a blunt nose at one end to a narrower portion at the other end, and also decreasing in depth towards the blunt end and merging into the under face of the board at the blunt end, each side of the ridge merging into the under face of the board along concavities of decreasing depth towards the blunt end of the ridge.

2. A molding board for apparatus of the class described comprising, a board-like member having a longitudinally disposed ridge depending centrally therefrom and extending over a part of the length thereof, said ridge gradually developing from a blunt nose at one end to a narrower fin-like portion at the other end and also decreasing in depth towards the blunt end and merging into the under face of the board at the blunt end, each side of the ridge merging into the under face of the board along concavities of decreasing depth towards the blunt end of the ridge.

3. A molding board according to claim 2, in which the ridge is formed with a non-cutting concavo-convex contour in cross-section.

4. Molding apparatus for French rolls and the like, comprising a table having one or more belt conveyors thereon, a molding board structure arranged in adjustable spaced relation vertically above and in longitudinal alignment with said belt conveyor, a supporting frame for said molding board comprising side plates between which said molding operatively fits, said molding board formed with a longitudinally disposed ridge depending centrally therefrom, said ridge gradually developing from a blunt nose at the receiving end of the apparatus to a narrower fin-like portion at the discharge end and also decreasing in depth towards the blunt end and merging into the under face of the board at the blunt end, each side of the ridge merging into the under face of the board along concavities of decreasing depth towards the blunt end of the ridge.

5. A molding board for apparatus of the class described, in contact with which dough is adapted to move always in the same direction and which comprises a board-like member having a longitudinally disposed ridge depending centrally therebelow, said ridge being of varying depth and decreasing thickness in the direction of movement of the dough.

6. A molding board for apparatus of the class described comprising a board-like member having a longitudinally disposed ridge depending centrally there below, said ridge being of varying depth and thickness and being formed with a blunt, non-cutting, concavo-convex contour in cross section, the sides of said ridge measured longitudinally thereof merging into the under face of the board along concavities of varying depth.

JACOB LAUDER RAITH.